Patented Sept. 9, 1924.

1,507,938

UNITED STATES PATENT OFFICE.

EDGAR SHANTZ, OF ROCHESTER, NEW YORK.

METHOD OF TREATING VEGETABLE IVORY.

No Drawing. Application filed April 17, 1923. Serial No. 632,794.

*To all whom it may concern:*

Be it known that I, EDGAR SHANTZ, a citizen of the United States, residing at Rochester, in the county of Monroe and State of New York, have invented certain new and useful Improvements in Methods of Treating Vegetable Ivory; and I do hereby declare the following to be a full, clear, and exact description of the invention, such as will enable others skilled in the art to which it appertains to make and use the same.

This invention relates to a method of treating vegetable ivory whereby its bulk may be substantially and permanently increased.

In the manufacture of buttons and the like from ivory nuts, it is customary to dry the material to about the degree of humidity which it will naturally maintain under normal atmospheric conditions. This involves a considerable shrinkage from the bulk of the nuts as received in commerce, or as in their natural moist condition.

The buttons made from ivory nuts are graded according to their diameters, and the prices of the larger sizes rise rapidly with the diameters, owing to the fact that relatively few blanks of large diameter can be obtained from the nuts. Blanks of diameters intermediate the standard sizes must usually be used for buttons of the next lower size, whereas a very slight increase in diameter would permit them to be used for a larger size, at a substantially higher price.

I have discovered that such increase in diameter may be produced and made permanent by impregnating the vegetable ivory with a substance of a hygroscopic nature, which will permanently retain a greater quantity of moisture than would remain in the material under normal conditions. The material used for this purpose should be such as will not injure the dyes by which the buttons are colored, and it should be sufficiently non-volatile to remain in the material. While I have used various substances for the purpose with certain degrees of success, I have found that glycerine is the most successful of those so far tried.

The preferred method of treatment is as follows: The material is first thoroughly moistened in water, either as a consequence of a dyeing operation or as a special operation. This causes it to increase in diameter about 10% from its normal dry condition. It is then immersed in a mixture of water and glycerine containing preferably about 40% of glycerine. The material may be left in the solution about 36 hours, though a shorter period may answer, according to the thickness of the pieces of material.

The material is then dried, and in doing so I have found it best to dry it first, at least partially, at normal atmospheric temperature, tho the operation may be completed in a heated atmosphere. During the drying operation the material shrinks again to some degree, but not to its original size. I have found that the treatment just described will usually produce a permanent enlargement or swelling of the material of about 4½% to 5%. While I do not certainly know the reason for this, I attribute it to the fact that the hygroscopic substance with which the material is impregnated retains and maintains within the material a quantity of moisture greater than would normally remain there. This supposition is supported by the fact that if a button so treated be dried long enough at a high temperature, it will shrink to such a degree as to lose about one-half of the gain over its original size, but if then exposed to the normal atmosphere it will slowly swell again until it has regained all of the additional bulk due to the treatment.

Where an expansion of less than the maximum is desired, the material may be treated with a weaker mixture of glycerine. A mixture of 20% glycerine will cause the buttons or blanks to increase about 2% in diameter.

Other substances which I have used with more or less success in place of glycerine include invert sugar and butyl alcohol, tho these do not cause as great expansion as glycerine.

A valuable feature of the invention resides in the fact that the material so treated may be polished the same as untreated material, and that no effects whatever from the process are produced in the appearance of the material. The process is applicable not only to the material most commonly known and used as vegetable-ivory, but also to the other proteid vegetable materials of similar characteristics. In the material known in commerce as the "apple-nut" an expansion of 6% may be produced by the use of glycerine.

The invention claimed is:

1. Vegetable proteid or "ivory" impregnated with glycerine.

2. Vegetable proteid or "ivory" impregnated with a non-volatile hygroscopic material.

3. The method of treating vegetable proteid or "ivory" which consists in soaking it in a mixture of water and glycerine, and then drying the surplus water from the material.

4. The method of treating vegetable proteid or "ivory" which consists in soaking it first in water, and then in a mixture of water and a hygroscopic substance, and then reducing the water-content of the material to that which it will retain under normal atmospheric conditions.

5. Vegetable proteid or "ivory" containing a supernormal quantity of water retained by a hygroscopic substance artificially incorporated in the material.

6. Vegetable proteid or "ivory" containing glycerine, combined with water in sufficient quantity to swell the material substantially, but not sufficient to appreciably affect its appearance or superficial characteristics.

EDGAR SHANTZ.